June 6, 1967 HISAO MAEDA 3,324,305

PARAMETRON

Filed June 18, 1963

3,324,305

PARAMETRON

Hisao Maeda, 211 Minamisenzoku-machi, Ota-ku, Tokyo-to, Japan

Filed June 18, 1963, Ser. No. 288,803
Claims priority, application Japan, June 27, 1962, 37/26,293
1 Claim. (Cl. 307—88)

This invention relates to so-called parametrons utilized as operational elements of electronic computers, electronic exchangers, and like devices.

The parametron logical circuit of such a device as an electronic computer electronic exchanger is formed by successively coupling a large number of parametron elements through coupling circuits. For this reason its network is extremely complicated, and the physical size of the entire apparatus unavoidably becomes considerably large.

It is an object of the present invention to provide a new parametron element capable of effecting concentration and micro-miniaturization of such parametron networks.

The nature, principles, and details of the invention will be best understood by reference to the following description when taken in conjunction with the accompanying drawing in which like parts are designated by like reference numerals and letters, and in which.

Figure 1:
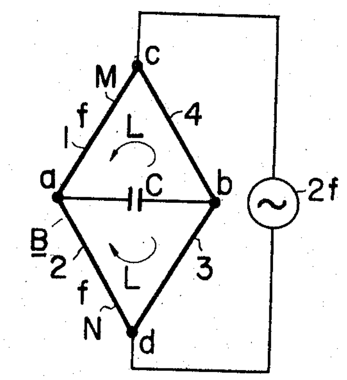
FIG. 1 is a circuit diagram indicating the principle of a parametron of bridge type.
Figure 3:
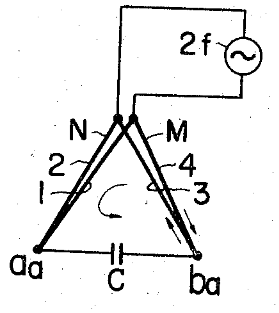
Figure 7:
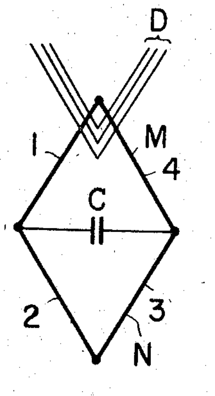
Figure 8:
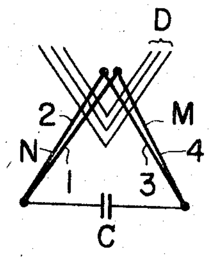

FIGS. 3 through 6, inclusive, are connection diagrams showing embodiments of the parametron of the invention;

FIGS. 7 and 8 are connection diagrams indicating the states of the circuits of FIGS. 1 and 3, respectively, resulting from providing the said circuits with coupling circuits.

Figure 2:
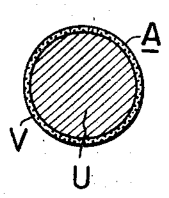
FIG. 2 is an enlarged cross sectional view showing a wire covered with a magnetic substance.

In order to facilitate a full understanding of the invention the following description is presented with reference to the circuit diagram of FIG. 1 indicating the principle of a bridge-type parametron. The four arms 1, 2, 3, and 4 of a balanced bridge B are formed through the use of a wire A covered by magnetic substance, as indicated in FIG. 2, for example, in which a covering of a film V of a ferromagnetic material (or paramagnetic material) such as Permalloy or nickel is caused by a method such as plating or evaporation to adhere onto the surface of a core conductor U of non-magnetic material (or a diamagnetic material) such as copper, Invar, or molybdenum. A tuning capacitor C is inserted between the junction *a* of the arms 1 and 2 and the junction *b* of the arms 3 and 4. Then, if an exciting voltage (with a super-imposition of a direct current $I_{DC}$) of an exciting frequency of $2f$ is impressed across the other junctions *c* and *d*, an oscillation voltage of a frequency $f$ will be created at the two terminals of the aforesaid tuning capacitor C. The arrows shown in FIG. 1 indicate the resulting oscillation current direction.

If, now, the respective inductances of the tuning circuit M consisting of the arms 1 and 4 and of the tuning circuit N consisting of the arms 2 and 3 of the above-described balanced bridge B are caused to be equal, and each is denoted by L, the oscillation frequency $f$ can be expressed by the following equation.

$$f=\frac{1}{2\pi\sqrt{\frac{L}{2}C}}$$

where C is the capacitance of the tuning capacitor C.

Next, it will be assumed that the arms 2 and 3 of the balanced bridge B shown in FIG. 1 is folded over along the line $a_a$–$b_b$ to cause the arms 2 and 3 to be superimposed on the arms 1 and 4, respectively, as indicated in FIG. 3. In this case, the magnetic lines of force created by the currents flowing through the four arms of the balanced bridge B are caused to be disposed along the circumferential direction through the magnetic material covering layer of the wire A, and there is almost no leakage to the outside. Accordingly, coupling is not achieved when the arms 2 and 3 are caused to approach arms 1 and 4, respectively, to a substantial degree, yet, when they are caused to approach arms 1 and 4 to an extreme degree, coupling is achieved to a certain extent. For this reason, the oscillation frequency $f$ in the case illustrated in FIG. 3 is expressed by the following equation.

$$f=\frac{1}{2\pi\sqrt{\frac{1}{n}LC}}$$

where $1<n<2$. That is, in the case wherein the respectively superimposed arms are mutually fully coupled, $n=1$; and in the case wherein they are not coupled at all, $n=a$. In actual practice, however, there is coupling to a certain extent, wherefore $n$ is in the range expressed by $1<n<2$.

Figure 4:
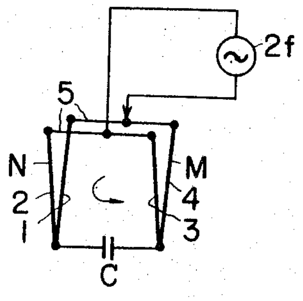

FIG. 4 illustrates a connection arrangement wherein the respective terminals of arms 1 and 4 and arms 2 and 3 are respectively connected by terminal wires 5 (for which wires covered with a magnetic substance may be used). The magnetic flux leakage from the terminal wires 5 is relatively high, and the tuning circuits M and N are substantially coupled. Although this arrangement has advantages such as the possibility of causing these terminal wires 5 to be commonly used in the succeeding stage to facilitate coupling to the succeeding stage, or to provide these terminal wires 5 in the form of a printed circuit so as to facilitate wiring, this arrangement, at the same time, has the disadvantage of high exciting power.

Figure 5:
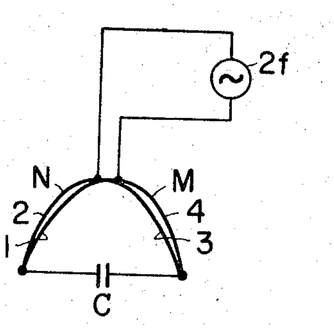

FIG. 5 illustrates an arrangement in which the arms 1 and 4 and the arms 2 and 3 are respectively formed as loops, and the exciting voltage is impressed on the respective centers of these loops. This arrangement is exactly equivalent to that shown in FIG. 3.

Figure 6:
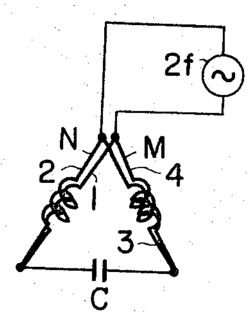

FIG. 6 indicates the case wherein the arms 1 and 2 are mutually twisted together and the arms 3 and 4 are mutually twisted together, or these two groups of arms are made to assume the form of double coils, so as to increase the degree of coupling of the arms.

In all cases, the parametron according to this invention is one in which two similar loops of wire covered with a magnetic substance connected to a common tuning capacitor are placed in superimposed relation, and means are provided to impress an exciting voltage on the respective centers of these loops. Since the superimposed loops are mutually coupled to a certain extent, the parametron of this invention is, therefore, different from a bridge-type parametron.

For example, the inductance of the tuning circuits of the parametron of this invention becomes higher than that of a bridge-type parametron. In other words, miniaturization beyond that of the bridge type can be achieved. Furthermore, as indicated by comparison of FIGS. 7 and 8, the degree of coupling in the case when a coupling circuit D is established is substantially higher in the parametron of this invention in comparison with that of a bridge type (as shown in FIG. 7).

Moreover, since there is almost no necessity of considering the effect due to leakage to the outside of magnetic lines of force at the exciting frequency, the formation of a large number of parametrons is greatly facilitated, and, at the same these parametrons can be made compact. More explicitly, the currents flowing through each combination of superimposed arms flow in mutually opposite directions as indicated in FIG. 3. Consequently, the magnetic lines of force acting at a certain point on the outside are such that magnetic lines of force of mutually different directions act equally. Accordingly, the resulting net effect becomes zero.

Furthermore, it will be apparent that the construction of the parametron of this invention whereby the circuits M and N are superimposed affords miniaturization to approximately one half of the size of the conventional bridge type. Thus, it is to be observed that the present invention contributes substantially to the concentration and miniaturization of parametron logical circuits.

Although the present invention has been described in connection with particular embodiments thereof, it is to be understood that modifications and variations may be resorted to therein without departing from the spirit and scope of the invention, as those skilled in the art will readily understand, and such modifications and variations are to be considered as being within the purview and scope of the invention and appended claim.

What is claimed is:

A parametron comprising two mutually similar loops of wire covered with a magnetic substance, the said loops being connected to a common tuning capacitor and being mutually superimposed, and means to impress exciting voltage on approximately the center part of each loop.

References Cited

UNITED STATES PATENTS

| | | | |
|---|---|---|---|
| 2,998,840 | 9/1961 | Davis | 307—88 |
| 3,051,891 | 8/1962 | Jorgensen | 307—88 |
| 3,275,839 | 9/1966 | Bartik | 307—88 |

BERNARD KONICK, *Primary Examiner.*

T. W. FEARS, *Assistant Examiner.*